United States Patent [19]
Dalson et al.

[11] 3,875,047

[45] Apr. 1, 1975

[54] PLATINUM-RHENIUM SERIAL REFORMING IN FOUR BEDS

[75] Inventors: Milton H. Dalson, Mendham; William C. Pfefferle, Middletown, both of N.J.; James P. Gallagher, Park Forest, Ill.

[73] Assignees: Atlantic Richfield Company, New York, N.Y. ; by said James P. Gallagher; Engelhard Minerals & Chemicals Corporation, Murray Hill, N.J. ; by said Milton H. Dalson and William C. Pfefferle

[22] Filed: Apr. 18, 1973

[21] Appl. No.: 352,098

Related U.S. Application Data

[63] Continuation-in-part of Ser. No. 45,939, June 12, 1970, abandoned.

[30] Foreign Application Priority Data

June 20, 1969  Canada .................................. 54901

[52] U.S. Cl. .................................... 208/65, 208/138

[51] Int. Cl. ........................ C10g 35/08, C10g 39/00
[58] Field of Search ....................... 208/65, 138, 139

[56] References Cited
UNITED STATES PATENTS

| | | | |
|---|---|---|---|
| 3,011,965 | 12/1961 | Decker ................................ | 208/65 |
| 3,091,584 | 5/1963 | Singer .................................. | 208/65 |
| 3,392,107 | 7/1968 | Pfefferle ............................. | 208/138 |
| 3,415,737 | 12/1968 | Kluksdahl ........................... | 208/138 |
| 3,676,328 | 7/1972 | Dalson et al. ....................... | 208/138 |

*Primary Examiner*—Delbert E. Gantz
*Assistant Examiner*—S. Berger
*Attorney, Agent, or Firm*—Frank J. Uxa

[57] ABSTRACT

Naphtha containing 40 to 60 percent naphthenes, 5 to 25 percent aromatics and 25 to 55 percent paraffins is reformed in a system including 4 serially-arranged beds of catalyst containing platinum and rhenium supported on a porous, solid base. The inlet pressure to the first bed is 100 to 350 psig and defined space velocities for the beds are disclosed.

6 Claims, No Drawings

PLATINUM-RHENIUM SERIAL REFORMING IN FOUR BEDS

This is a continuation-in-part of application Ser. No. 45,939, filed June 12, 1970 and now abandoned.

This invention relates to the catalytic reforming of petroleum naphthas which are of high naphthene content in order to increase their octane number. The naphthas contain from 40 to 60 percent by weight of naphthenes, from 5 to 25 percent by weight of aromatics and from 25 to 55 percent by weight of paraffins. The catalyst used contains platinum and rhenium supported on a porous, solid base, such as alumina, and is disposed in four reactors in such proportions that the weight hourly space velocity (WHSV, meaning weight units of naphtha feed per weight unit of catalyst per hour) for each reactor falls within certain defined limits.

It is known in the art to reform petroleum naphthas in order to increase their octane number by passing them at elevated conditions of temperature and pressure in admixture with hydrogen gas into contact with a reforming catalyst. Among the reforming catalysts which have been proposed are catalysts having platinum and rhenium supported on alumina. When naphthas are reformed, naphthenes are dehydrogenated to aromatics and paraffins are dehydrocyclized to naphthenes and aromatics. Other reactions also take place.

Certain naphthas are known which contain a relatively high proportion of naphthenes. Such naphthas are exemplified by naphthas derived from Mid-Continent and Gulf Coast crudes, and by certain hydrocrackates, and generally contain from 40 to 60 percent by weight of naphthenes, from 5 to 25 percent by weight of aromatics and from 25 to 55 percent by weight of paraffins. Such naphthas are relatively easy to reform to produce reformate of high octane number. However, the present invention provides a method for reforming such naphthas at low pressure to produce reformate of high octane number with a low rate of catalyst aging, the result being that a reduced amount of the catalyst need be placed in the reforming system and that increased yields of liquid products are obtained.

Still discussing the prior art, it has heretofore been proposed to construct catalytic reforming plants in which the catalyst is disposed in four reactors arranged in series. Before each reactor, means such as furnaces are provided to heat the mixture of hydrogen and hydrocarbon introduced into a given reactor. Compared with the amount of catalyst in the first reactor, it has been proposed to use a larger amount of catalyst in the second reactor and still larger amounts of catalyst in the following reactors.

The catalyst employed in accordance with the method of this invention contains both platinum and rhenium supported on a porous, solid base. In general, the catalyst will contain from 0.1 to 3 percent by weight of platinum and from 0.01 to 5 percent by weight of rhenium. The porous, solid base or carrier for the platinum and rhenium can be any of a large number of materials which have heretofore been used in the art as catalyst supports. Thus, the carrier can be, for example, silicon carbide, charcoal or carbon. Preferably, the carrier is an inorganic oxide. A high surface area inorganic oxide is particularly preferred, for example, an inorganic oxide having a surface area of from 50 to 700 square meters per gram. The carrier can be a natural or a synthetically produced inorganic oxide or combination of inorganic oxides. Acidic inorganic oxide supports which can be used are the naturally occurring aluminum silicates, particularly when acid treated to increase the activity, and the synthetically produced, cracking supports, such as silica-alumina, silica-zirconia, silica-alumina-zirconia, silica-magnesia, silica-alumina-magnesia, and crystalline zeolitic aluminosilicates. Acidic inorganic oxide supports are especially useful in the terminal reactor. Generally, however, the reforming process of this invention is preferably conducted using catalysts having low cracking activity, that is, catalysts of limited acidity. Hence, preferred carriers are inorganic oxides, such as magnesia and alumina.

A particularly preferred catalytic carrier for the purpose of this invention is alumina. Any of the forms of alumina suitable as a support for reforming catalysts can be used. A particularly desirable alumina is one which is characterized by large pore, high area base structure, essentially composed of gamma alumina modifications resulting from the drying and calcination of a mixture of precursor hydrous alumina phases containing about 65 to 95 percent of trihydrate. The preparation of such alumina is described in U.S. Pat. No. 2,838,444. The alumina base can, if desired, contain from 0.3 to 1.5 percent by weight of halogen, such as chlorine or fluorine, preferably from about 0.6 to 0.9 percent by weight. Further details concerning the preparation of platinum-rhenium catalysts are set forth in U.S. Pat. No. 3,415,737 to Kluksdahl.

When the catalyst is initially contacted with the naphtha, the platinum and rhenium are preferably sulfided. The platinum and rhenium, when in the form of free metal, can easily be sulfided by contacting the catalyst with hydrogen sulfide or dimethyldisulfide until the catalyst no longer absorbs the hydrogen sulfide or dimethyldisulfide. On the other hand, hydrogen sulfide or dimethyldisulfide can be contacted with the catalyst along with the naphtha at the time when the naphtha is initially introduced, in the event that one wishes to initiate the reforming operation with a catalyst in which the platinum and rhenium are in the form of free metal. When the operation is carried out in this manner, the amount of hydrogen sulfide or dimethyldisulfide introduced is at least about 50 percent, or even at least about 80 percent, of the stoichiometric amount needed to give one atomic weight of sulfur for each atomic weight of total platinum and rhenium in the catalyst. Advantageously, the hydrogen introduced into the reaction system will have admixed with it from about 5 to about 100 parts per million by volume of water vapor, preferably from 15 to 50 parts per million by volume of water vapor.

When the naphtha reforming process of this invention is practiced, the catalyst is disposed in four beds which are arranged in series. The weight hourly space velocity, based upon naphtha feed and the total amount of catalyst present in the four beds, is in the range from two to six. In the first reactor, the weight hourly space velocity, based upon naphtha feed, is in the range from 20 to 50, preferably about 30 to 50. In the second reactor, the weight hourly space velocity, based upon naphtha feed, is in the range from 15 to 40, preferably about 20 to 30 or 40. In the third reactor, the weight hourly space velocity, based upon naphtha feed, is in the range from about 5 to 20. In the fourth reactor, the weight hourly space velocity is frequently in the range of about 3 to 15.

The naphtha is introduced into the first reactor along with hydrogen gas in the amount of from 2.5 to 12 mols, preferably about 2.5 to 6 or 8 mols, of hydrogen per mol of naphtha. The temperature of the mixture introduced into each reactor is in the range from 850° to 1,000°F., and the inlet pressure to the first reactor in the series is in the range from 100 to 350 psig. Also, the total feed, including naphtha and hydrogen, introduced into the first reactor should not contain more than 20 parts per million by weight of sulfur. Where a guard reactor is used before the first reactor containing the platinum-rhenium catalyst, in order to remove sulfur, arsenic and nitrogen, the Research octane number neat of the normally liquid product after the guard reactor should not exceed 70.

EXAMPLE

The naphtha feed is one obtained from Gulf Coast crude, has a gravity of 48.1°API, and has an initial boiling point of 202°F. and an end point of 394°F., both ASTM. The naphtha contains 55.5 percent by weight of naphthenes, 18.5 percent by weight of aromatics and 26.0 percent by weight of paraffins.

The catalyst used contains 0.6 percent by weight of platinum and 0.6 percent by weight of rhenium on an alumina base prepared in accordance with the teachings of U.S. Pat. No. 2,838,444 to Teter, Gring and Keith. The base is composed of about 9 percent by weight of amorphous alumina, about 10 percent by weight of boehmite, about 28 percent by weight of bayerite, and about 53 percent by weight of nordstrandite plus gibbsite, and contains about 0.75 percent by weight of chloride. The catalyst is presulfided by passing through it at 750°F. and 100 psig a mixture composed of 99 percent by weight of hydrogen and 1 percent by weight of hydrogen sulfide. The mixture of hydrogen and hydrogen sulfide is passed through the catalyst until one atom of sulfur has been supplied for each atom of platinum and each atom of rhenium in the catalyst.

The catalyst is disposed in four reactors which are arranged in series. The reaction system also includes four furnaces, one being located before the first reactor, the second being located between the first and second reactors, the third being located between the second and third reactors, and the fourth being located between the third and fourth reactors. The weight hourly space velocity, based upon the total naphtha feed and the total weight of catalyst in the four reactors, is about 4. The weight hourly space velocity in the first reactor, based upon naphtha feed, is about 30. The weight hourly space velocity in the second reactor, based upon naphtha feed, is about 25; the weight hourly space velocity in the third reactor, based upon naphtha feed, is about 15; and the weight hourly space velocity in the fourth reactor, based upon naphtha feed, is about 9.

The reaction system also includes a cooler and a separator after the fourth reactor in which the effluent from the fourth reactor is cooled and separated into a gaseous fraction containing hydrogen and some normally gaseous hydrocarbons (chiefly methane) and liquid reformate. A portion of the gaseous fraction is recycled to the first reactor in amount such that four mols of hydrogen are introduced into the first reactor in admixture with the fresh naphtha feed to be reformed. The remainder of the gaseous fraction is withdrawn from the reforming system.

As has been stated, the reforming system is provided with four furnaces, one being located before each reactor. By means of these furnaces, the reaction mixture introduced into each reactor is maintained at 925°F. The inlet pressure to the first reactor is 250 psig. The total feed, including naphtha and gas recycled to the first reactor, contains 10 ppm of sulfur by weight. The hydrogen-containing gas recycled to the first reactor includes 35 ppm of water vapor by volume. When the operation is carried out in this manner, there is produced a liquid reformate having a Research octane number neat of about 95.

It is claimed:

1. A process of reforming a petroleum naphtha containing from 40 to 60 percent by weight of naphthenes, from 5 to 25 percent by weight of aromatics and from 25 to 55 percent by weight of paraffins, which comprises passing the naphtha in admixture with hydrogen into contact with four beds of catalyst containing from 0.1 to 3 percent by weight of platinum and from 0.01 to 5 percent by weight of rhenium supported on a porous, solid base comprising alumina disposed in four beds arranged in series: the inlet temperature to each bed being within the range from 850° to 1,000°F.; the inlet pressure to the first bed being within the range from 100 to 350 psig; the weight hourly space velocity, based upon naphtha feed and the total amount of catalyst present in the four beds, being within the range from 2 to 6; the weight hourly space velocity in the first bed, based upon naphtha feed, being within the range from about 30 to 50; the weight hourly space velocity in the second bed, based upon naphtha feed, being within the range from about 20 to 40; the weight hourly space velocity in the third bed, based upon naphtha feed, being within the range from about 5 to 20; the total amount of hydrogen introduced into the reforming process being within the range from 2.5 to 12 mols of hydrogen per mole of naphtha, based upon the mols of fresh naphtha feed; and the sulfur content of the total feed being not more than 20 parts per million by weight.

2. The process of claim 1 wherein the weight hourly space velocity in the fourth bed, based upon naphtha feed, is within the range from about 3 to 15.

3. The process of claim 1 wherein the weight hourly space velocity in the second bed, based upon naphtha feed, is within the range from about 20 to 30.

4. The process of claim 1 wherein the weight hourly space velocity in the first bed, based upon naphtha feed is about 30, the weight hourly space velocity in the second bed, based upon naphtha feed, is about 25, and the weight hourly space velocity in the third bed, based upon naphtha feed, is about 15.

5. The process of claim 4 wherein the weight hourly space velocity of the fourth bed, based upon naphtha feed, is about 9.

6. The process of claim 1 wherein the total amount of hydrogen introduced into the reforming process is from about 2.5 to 8 mols of hydrogen per mole of naphtha, based upon the moles of fresh naphtha feed.

* * * * *